(12) United States Patent
Jiang et al.

(10) Patent No.: US 12,483,151 B2
(45) Date of Patent: Nov. 25, 2025

(54) POWER SUPPLY DEVICE AND CHARGING CONTROL METHOD

(71) Applicant: GUANGDONG OPPO MOBILE TELECOMMUNICATIONS CORP., LTD., Dongguan (CN)

(72) Inventors: Senlong Jiang, Dongguan (CN); Jun Zhang, Dongguan (CN); Chen Tian, Dongguan (CN); Jialiang Zhang, Dongguan (CN); Chih-wei Chiu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 594 days.

(21) Appl. No.: 17/942,306

(22) Filed: Sep. 12, 2022

(65) Prior Publication Data
US 2023/0006563 A1    Jan. 5, 2023

Related U.S. Application Data

(63) Continuation of application No. PCT/CN2021/078539, filed on Mar. 1, 2021.

(30) Foreign Application Priority Data

Mar. 12, 2020 (CN) .......................... 202010172277.8

(51) Int. Cl.
*H02M 3/335* (2006.01)
*H02M 1/00* (2006.01)
(Continued)

(52) U.S. Cl.
CPC ....... *H02M 3/33576* (2013.01); *H02M 1/008* (2021.05); *H02M 3/156* (2013.01); *H02M 7/219* (2013.01)

(58) Field of Classification Search
CPC .. H02M 3/33576; H02M 1/008; H02M 3/156; H02M 7/219
See application file for complete search history.

(56) References Cited

U.S. PATENT DOCUMENTS

2003/0227280 A1* 12/2003 Vinciarelli ............ H02M 7/003
                                                    323/265
2005/0088858 A1*  4/2005 Kogel ............... H02M 3/33561
                                                    348/E5.127
(Continued)

FOREIGN PATENT DOCUMENTS

CN       104779784 A       7/2015
CN       105121212 A      12/2015
(Continued)

OTHER PUBLICATIONS

The supplementary European search report dated Aug. 3, 2023 from European patent application No. 21767371.4.
(Continued)

*Primary Examiner* — Rafael O De Leon Domenech
(74) *Attorney, Agent, or Firm* — BAYES PLLC

(57) ABSTRACT

A power supply device includes a transformer, a first rectifier, a first voltage conversion module, a second voltage conversion module, and a control unit. The first rectifier, connected to a primary winding of the transformer, converts a received alternating-current voltage to a first direct-current voltage. The first voltage conversion module is connected to the first secondary winding of the transformer. The second voltage conversion module is connected to the second secondary winding of the transformer. The control unit, connected to the first voltage conversion module and second voltage conversion module, controls the first voltage conversion module or second voltage conversion module to adjust an output voltage or an output current of the power supply device.

19 Claims, 6 Drawing Sheets

(51) Int. Cl.
*H02M 3/156* (2006.01)
*H02M 7/219* (2006.01)

(56) References Cited

U.S. PATENT DOCUMENTS

| | | | |
|---|---|---|---|
| 2009/0141519 A1 | 6/2009 | Hong et al. | |
| 2018/0026472 A1* | 1/2018 | Zhang | H02M 3/33576 320/145 |
| 2018/0166903 A1 | 6/2018 | Sato et al. | |
| 2019/0356156 A1* | 11/2019 | Wan | H02J 50/80 |
| 2019/0393798 A1 | 12/2019 | Yu et al. | |

FOREIGN PATENT DOCUMENTS

| | | |
|---|---|---|
| CN | 206341146 U | 7/2017 |
| CN | 206490598 U | 9/2017 |
| CN | 206742931 U | 12/2017 |
| CN | 107623365 A | 1/2018 |
| CN | 108539832 A | 9/2018 |
| EP | 1962415 A2 | 8/2008 |
| EP | 3267568 A1 | 1/2018 |
| JP | H10285830 A | 10/1998 |

OTHER PUBLICATIONS

The Third Office Action dated Jul. 5, 2023 from Chinese application No. 202010172277.8.
The Notice of Allowance dated Aug. 21, 2023 from Chinese application No. 202010172277.8.
The Second Office Action dated Feb. 26, 2023 from Chinese patent application No. 202010172277.8.
International Search Report and Written Opinion Dated Apr. 23, 2021 from International Application No. PCT/CN2021/078539.
The First Office Action with Search Report Dated Jul. 4, 2022 from Chinese Application No. 202010172277.8.

* cited by examiner

POWER SUPPLY DEVICE AND CHARGING CONTROL METHOD

CROSS-REFERENCE TO RELATED APPLICATIONS

This application is a continuation of International Application No. PCT/CN2021/078539, filed on Mar. 1, 2021, which claims the benefit of priority to Chinese Application No. 202010172277.8, filed on Mar. 12, 2020, both of which are incorporated herein by reference in their entireties.

TECHNICAL FIELD

The present disclosure relates to a technical field of charging, and in particular, to a power supply device and a charging control method.

BACKGROUND

An AC-DC power supply device (such as a power adapter) can convert an alternating-current power to a direct-current power for charging mobile phones, laptops, and other devices. An AC-DC power supply device includes a transformer, and a control circuit is arranged on the primary side of the transformer. Due to the high voltage on the primary side, a package of a required high-voltage withstanding device is usually large. Accordingly, the size of the power adapter is larger, which is inconvenient for portability and degrading user experience.

The information disclosed in the above Background section is only for better understanding of the background of the disclosure, and, therefore, it may contain information that does not constitute the prior art that has known to a person having ordinary skill in the art.

SUMMARY

One objective of embodiments of the present disclosure is to provide a power supply device and a charging control method, so as to make a small size power supply device.

Other features and advantages of the present disclosure are introduced in the following detailed description, or learned in part by practice of the present disclosure.

One embodiment of the present disclosure is directed to a power supply device. The power supply device includes a transformer, a first rectifier, a first voltage conversion module, a second voltage conversion module, and a control unit. The transformer includes a primary winding, a first secondary winding, and a second secondary winding. The first rectifier is connected to the primary winding of the transformer and configured to convert a received alternating-current voltage to a first direct-current voltage. The transformer is configured to convert the first direct-current voltage to a second direct-current voltage provided by the first secondary winding and a third direct-current voltage provided by the second secondary winding. The first voltage conversion module is connected to the first secondary winding of the transformer. The second voltage conversion module is connected to the second secondary winding of the transformer. Alternatively, the second direct-current voltage is converted by the first voltage conversion module or the third direct-current voltage is converted by the second voltage conversion module for outputting a fourth direct-current voltage. The control unit is connected to the first voltage conversion module and second voltage conversion module, and configured to control the first voltage conversion module or second voltage conversion module to adjust an output voltage or an output current of the power supply device.

In one embodiment of the present disclosure, the power supply device further comprises a first input capacitor and a second capacitor. The first voltage conversion module is connected to the first secondary winding of the transformer through the first input capacitor. The second voltage conversion module is connected to the second secondary winding of the transformer through the second input capacitor.

In one embodiment of the present disclosure, the second direct-current voltage and the third direct-current voltage have the same waveform and the same voltage value.

In one embodiment of the present disclosure, the first voltage conversion module is configured to convert on the second direct-current voltage to output the fourth direct-current voltage in response to a voltage value of the second direct-current voltage being higher than a voltage threshold, and the second voltage conversion module is configured to convert the third direct-current voltage to output the fourth direct-current voltage in response to a voltage value of the second direct-current voltage being lower than the voltage threshold.

In one embodiment of the present disclosure, the control unit is further configured to control the first voltage conversion module to convert the second direct-current voltage to output the fourth direct-current voltage in response to a voltage value of the second direct-current voltage being higher than a voltage threshold, and further control the second voltage conversion module to convert the third direct-current voltage to output the fourth direct-current voltage in response to a voltage value of the second direct-current voltage being lower than the voltage threshold.

In one embodiment of the present disclosure, the control unit is further configured to receive an expected charging voltage fed back by a chargeable device connected to the power supply device. The voltage threshold is determined according to the expected charging voltage.

In one embodiment of the present disclosure, the control unit is further configured to receive first feedback information of a chargeable device connected to the power supply device. The control unit, according to the first feedback information, controls the first voltage conversion module or the second voltage conversion module to adjust the output voltage or the output current of the power supply device.

In one embodiment of the present disclosure, the first feedback information comprises an expected charging voltage or an expected charging current of the chargeable device, or comprises an adjustment command which is generated by the chargeable device based on the expected charging voltage or the expected charging current.

In one embodiment of the present disclosure, the power supply device further comprises a switch unit connected to the primary winding of the transformer and configured to modulate the first direct-current voltage according to a high-frequency control signal.

In one embodiment of the present disclosure, the control unit is connected to the switch unit. The control unit is further configured to output the high-frequency control signal to the switch unit, receive second feedback information of a chargeable device connected to the power supply device, and adjust a frequency of the high-frequency control signal according to the second feedback information.

In one embodiment of the present disclosure, the second feedback information comprises: information of a charging stage of the chargeable device, information of electric quantity of a battery of the chargeable device, or information of temperature of the battery.

In one embodiment of the present disclosure, the power supply device further comprises a second rectifier and a third rectifier. The second rectifier is connected between the first secondary winding and the first voltage conversion module and configured to rectify the second direct-current voltage. The third rectifier is connected between the second secondary winding and the second voltage conversion module and configured to rectify the third direct-current voltage.

In one embodiment of the present disclosure, the first voltage conversion module comprises at least one of a BUCK circuit, a BUCK/Boost circuit, and a CUK circuit, and the second voltage conversion module comprises at least one of a Boost circuit, a BUCK/Boost circuit, and a CUK circuit.

One embodiment of the present disclosure is directed to a charging control method applied to a power supply device. The method comprises: converting a received alternating-current voltage to a first direct-current voltage by a primary side of a transformer; converting the first direct-current voltage to a second direct-current voltage and a third direct-current voltage through the transformer; on a secondary side of the transformer, alternatively converting the second direct-current voltage by a first voltage conversion module or converting the third direct-current voltage by a second voltage conversion module for outputting a fourth direct-current voltage; and controlling the first voltage conversion module or the second voltage conversion module to adjust an output voltage or an output current of the power supply device.

In one embodiment of the present disclosure, the second direct-current voltage and the third direct-current voltage have the same waveform and the same voltage value.

In one embodiment of the present disclosure, the charging control method on a secondary side of the transformer, the alternatively converting the second direct-current voltage by a first voltage conversion module or converting the third direct-current voltage by a second voltage conversion module for outputting a fourth direct-current voltage comprises: converting the second direct-current voltage by the first voltage conversion module to output the fourth direct-current voltage in response to a voltage value of the second direct-current voltage being higher than a voltage threshold; converting the third direct-current voltage by the second voltage conversion module to output the fourth direct-current voltage in response a voltage value of the third direct-current voltage being lower than the voltage threshold.

In one embodiment of the present disclosure, on a secondary side of the transformer, the alternatively converting the second direct-current voltage by a first voltage conversion module or converting the third direct-current voltage by a second voltage conversion module for outputting a fourth direct-current voltage comprises: controlling the first voltage conversion module to convert the second direct-current voltage to output the fourth direct-current voltage in response a voltage value of the second direct-current voltage being higher than a voltage threshold; controlling the second voltage conversion module to convert the third direct-current voltage by the second voltage conversion module to output the fourth direct-current voltage in response a voltage value of the third direct-current voltage being lower than the voltage threshold.

In one embodiment of the present disclosure, the charging control method further comprises: receiving an expected charging voltage fed back by a chargeable device connected to the power supply device. The voltage threshold is determined according to the expected charging voltage.

In one embodiment of the present disclosure, the charging control method further comprises: receiving first feedback information of a chargeable device connected to the power supply device; wherein the controlling the first voltage conversion module or the second voltage conversion module to adjust an output voltage and/or an output current of the power supply device comprises: controlling, according to the first feedback information, the first voltage conversion module or the second voltage conversion module to adjust the output voltage or the output current of the power supply device.

In one embodiment of the present disclosure, the first feedback information comprises: an expected charging voltage or an expected charging current of the chargeable device, or an adjustment command which is generated by the chargeable device based on the expected charging voltage or the expected charging current.

In one embodiment of the present disclosure, the charging control method further comprises: modulating the first direct-current voltage according to a high-frequency control signal.

In one embodiment of the present disclosure, the charging control method further comprises: receiving second feedback information of a chargeable device connected to the power supply device; and adjusting a frequency of the high-frequency control signal according to the second feedback information.

In one embodiment of the present disclosure, the second feedback information comprises: information of a charging stage of the chargeable device, information of electric quantity of a battery of the chargeable device, or information of temperature of the battery.

The power supply device of the embodiments of the present disclosure does not use bulky electrolytic capacitors and high-voltage withstanding filter capacitors on the primary side of the transformer for filtering the rectified pulsating direct-current voltage. The volume of the power supply device can be reduced. Moreover, by moving the voltage conversion portion to the secondary side of the transformer, the voltage conversion modules are only required to process voltages with lower amplitudes so that a stable constant direct-current voltage can be output after the conversion. The control circuit for the voltage conversion is provided on the secondary side of the transformer, which may further decrease the number of used devices and reduce the volume of the power supply device.

It should be understood that the foregoing general description and the following detailed description are exemplary and explanatory only and are not limiting of the present disclosure.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

Figure 1:
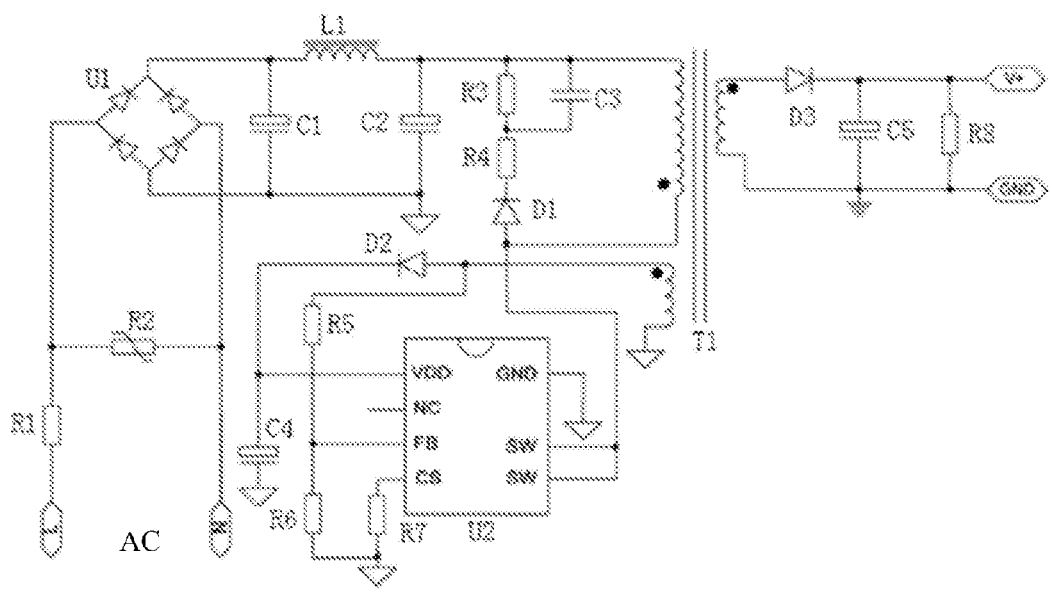
FIG. 1 is a schematic circuit diagram of an AC-DC power supply device in the related art.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present disclosure, and are not to be construed as limiting the scope of the present disclosure.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features.

FIG. 1 is a schematic circuit diagram of an AC-DC power supply device in the related art. AC power is input through an AC terminal. The AC power of 220V/50 Hz is taken as an example. The waveform of the input AC power is a 220V sine wave. Through a full-bridge rectifier U1 composed of four diodes, the input alternating-current power is rectified as an arc-shaped wave. The primary winding of the transformer T1 is connected to the switching pin SW of the switching power supply chip U2. A Pulse Width Modulation (PWM) square wave with a high frequency output by the switching pin SW is used to modulate the arc-shaped wave output by the rectifier U1. The feedback is obtained by a separate winding and input to the feedback pin FB of the switching power supply chip U2 so that the output voltage of the secondary side is stable.

An electrical apparatus (such as a chargeable device) may require an AC-DC power supply device for providing output voltages with different voltage values. For example, when a terminal that supports the power delivery (PD) protocol or the quick charge (QC) protocol requires an adapter for providing direct-current voltages with different voltage values, the AC-DC power supply device needs to communicate with the electrical apparatus through a communication chip. The electrical apparatus sends the required voltage value to the AC-DC power supply device. The AC-DC power supply device adjusts the pulse width or frequency of the output PWM signal according to the required voltage value, and obtains the feedback voltage from the winding of the transformer. The AC-DC power supply device also adjusts the pulse width or frequency of the PWM signal according to the feedback voltage, thereby obtaining a stable output voltage.

According to the above description, it can be understood that the control circuit for adjusting the output voltage is located at the primary side of the transformer. Because the voltage on the primary side is relatively high, and the package of the required voltage withstanding device is usually relatively large.

The power supply device and the charging control method of the present disclosure will be described in more detail with reference to the accompanying drawings and embodiments.

Figure 2:
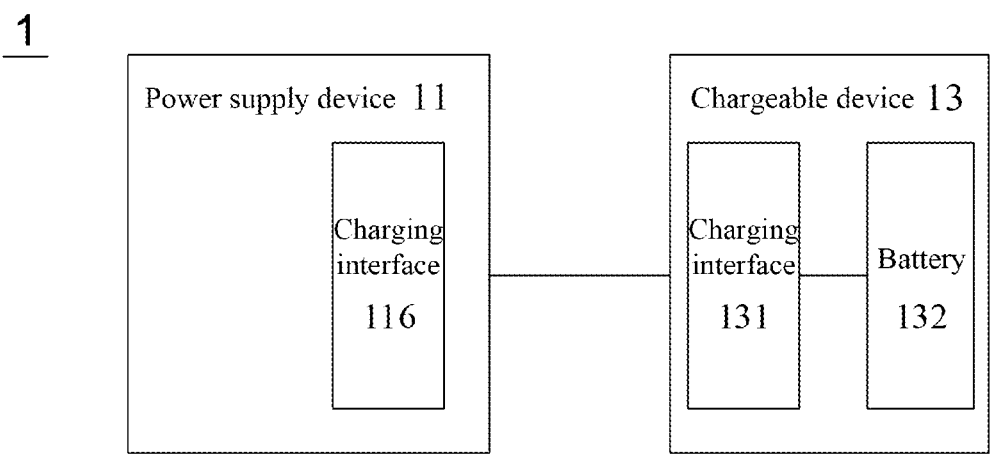
FIG. 2 is a schematic diagram of a charging system according to an exemplary embodiment of the present disclosure.

FIG. 2 is a schematic diagram of a charging system according to an exemplary embodiment of the present disclosure.

A charging system 1 comprises a power supply device 11 and a chargeable device 13.

The power supply device 11 is, for example, a power adapter, a power bank, or other equipment.

The power supply device 11 is connected to the chargeable device 13 through a wire and provides power to the chargeable device 13 for charging a battery 132 in the chargeable device 13.

The chargeable device 13 may be a terminal or an electronic apparatus. The terminal or electronic apparatus may be a mobile terminal, such as a mobile phone, a game console, a tablet computer, an e-book reader, a smart wearable apparatus, a Moving Picture Experts Group Audio Layer IV (MP4) player, a smart home apparatus, an Augmented Reality (AR) apparatus, and a Virtual Reality (VR) apparatus, or an electronic apparatus with a charging function, such as a mobile power sources (such as a power bank, a travel charger), an electronic cigarette, a wireless mouse, a wireless keyboard, a wireless headphone, and a Bluetooth speaker, or a personal computer (PC), such as a laptop portable computer and a desktop computer.

The chargeable device 13 is connected to a charging interface 116 in the power supply device 11 through a charging interface 131.

The charging interface 131 may be, for example, a female connector of a USB 2.0 interface, a Micro USB interface, or a USB TYPE-C interface. In some embodiments, the charging interface 131 may be a female connector of a lightning interface, or any other type of parallel port or serial port that can be used for charging.

The charging interface 116 may be a male connector of a USB 2.0 interface, a Micro USB interface, a USB Type C interface, or a Lightning interface that adapts to the charging interface 131.

The power supply device 11 may communicate with the chargeable device 13 through the charging interface 116 and the charging interface 131, and neither of them requires additional communication interfaces or other wireless communication modules. If the charging interface 116 and the charging interface 131 are USB interfaces, the power supply device 11 and the chargeable device 13 can communicate with each other based on the data lines (such as D+ and/or D− lines) in the USB interface. If the charging interface 116 and the charging interface 131 are USB interfaces (such as USB TYPE-C interfaces) that support the power delivery (PD) communication protocol, the power supply device 11 and the chargeable device 13 can communicate with each other based on the PD communication protocol. In addition, the power supply device 11 and the chargeable device 13 may also communicate through other communication means other than the charging interface 116 and the charging interface 131. For example, the power supply device 11 and the chargeable device 13 communicate with each other through wireless means, such as near field communication (NFC).

Figure 3:
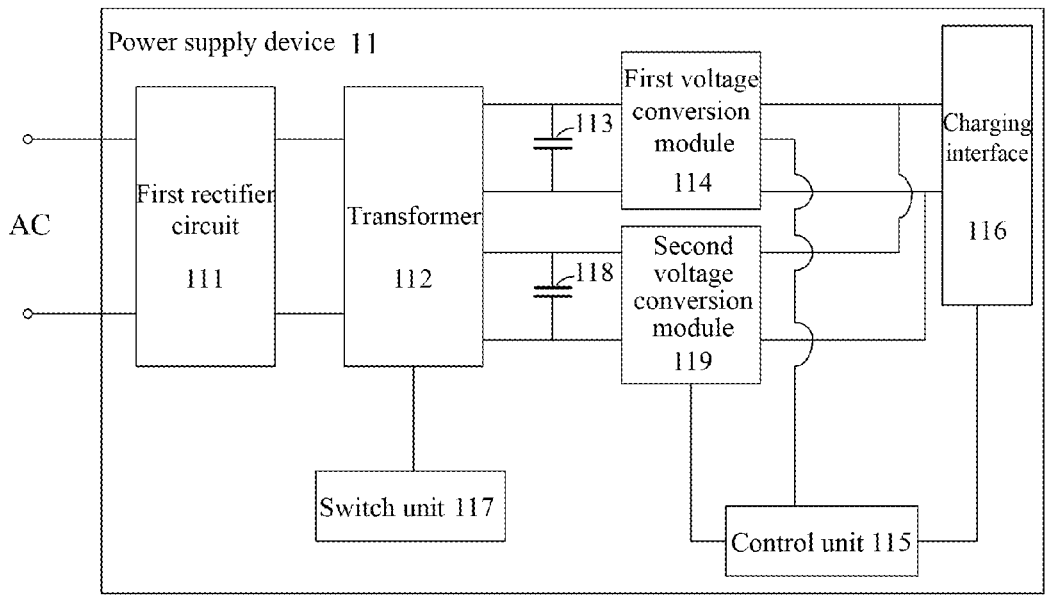
FIG. 3 is a schematic structure diagram of a power supply device according to an exemplary embodiment of the present disclosure.

FIG. 3 is a schematic structure diagram of a power supply device according to an exemplary embodiment of the present disclosure.

A power supply device 11 comprises a first rectifier 111, a transformer 112, a first input capacitor 113, a first voltage conversion module 114, a second input capacitor 118, a second voltage conversion module 119, a control unit 115, and a charging interface 116.

The first rectifier 111 is arranged on the primary side of the transformer 112 and configured to convert an alternating-current voltage received from an AC port to a first direct-current voltage. For example, the first direct-current voltage is a pulsating direct-current voltage.

Figure 4:
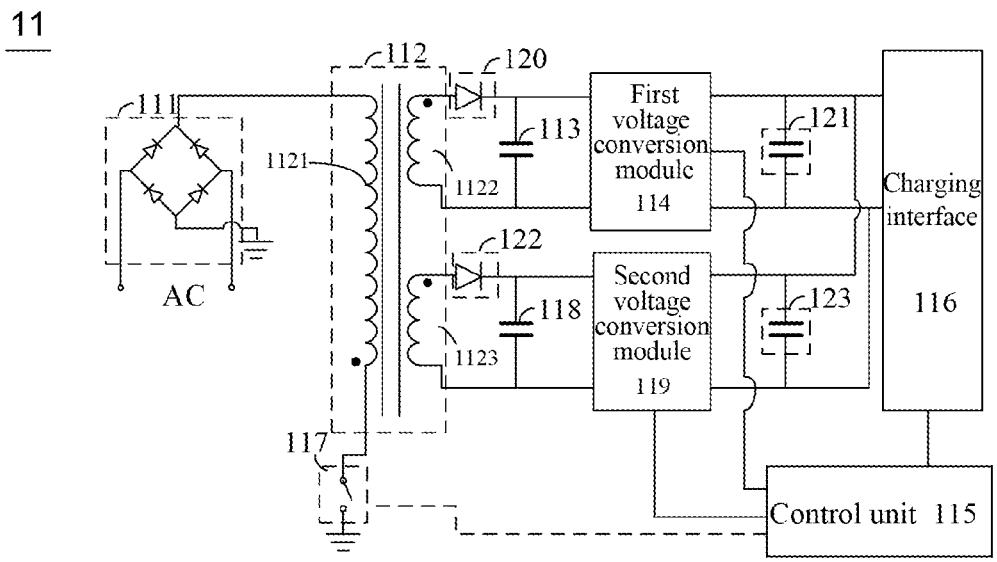
FIG. 4 is a schematic structure diagram of another power supply device according to an exemplary embodiment of the present disclosure.

FIG. 4 is a schematic structure diagram of another power supply device according to an exemplary embodiment of the present disclosure. The first rectifier 111 may be, for example, a full-bridge rectifier. However, the present disclosure is not limited thereto. The first rectifier 111 may be a half-bridge rectifier or another type of rectifiers.

The first rectifier 111 is connected to a primary winding 1121 of the transformer 112.

Referring to FIG. 3 and FIG. 4, both the first voltage conversion module 114 and the second voltage conversion module 119 are arranged on the secondary side of the transformer 112.

The first voltage conversion module 114 is connected to a first secondary winding 1122 of the transformer 112.

The second voltage conversion module 119 is connected to a second secondary winding 1123 of the transformer 112.

The transformer 112 is configured to convert the first direct-current voltage to a second direct-current voltage from the first secondary winding 1122 and a third direct-current voltage from the second secondary winding 1123.

When the first secondary winding 1122 and the second secondary winding 1123 are exactly the same (such as, the same number of winding turns and winding manner), the second direct-current voltage and the third direct-current voltage have the same waveform and the same voltage value. For example, the second direct-current voltage and the third direct-current voltage are both pulsating direct-current voltages.

The first input capacitor 113 is arranged between the first voltage conversion module 114 and the first secondary winding 1122 of the transformer 112. The first input capacitor 113 can prevent the second direct-current voltage, which is input to the first voltage conversion module 114, from being too low, thereby ensuring the normal operation of the first voltage conversion module 114.

In addition, the second input capacitor 118 is arranged between the second voltage conversion module 119 and the second secondary winding 1123 of the transformer 112. The second input capacitor 118 can prevent the third DC voltage, which is input to the second voltage conversion module 119, from being too low, thereby ensuring the normal operation of the second voltage conversion module 119.

Alternatively, it may be ensured that the input voltages of the first voltage conversion module 114 and the second voltage conversion module 119 are not too low through the control on the primary side of the transformer 112. For example, a control module is arranged on the primary side of the transformer 112 to control the input voltages that are input to the first voltage conversion module 114 and the second voltage conversion module 119 from being too low.

Alternatively, a fourth direct-current voltage may be output by converting the second direct-current voltage by the first voltage conversion module 114 or converting the third direct-current voltage by the second voltage conversion module 119.

The fourth direct-current voltage may be a constant direct-current voltage, but the present disclosure is not limited thereto. According to the requirements of the application scenario, the fourth DC voltage may be a pulsating DC voltage.

The first voltage conversion module 114 and the second voltage conversion module 119 may determine whether to convert the second direct-current voltage by themselves. Both the first voltage conversion module 114 and the second voltage conversion module 119 have built-in control circuits that store a preset voltage threshold respectively. When the voltage value of the second direct-current voltage is higher than the voltage threshold, the first voltage conversion module 114 operates to convert the second direct-current voltage to output the fourth direct-current voltage. When the voltage value of the third direct-current voltage is lower than the voltage threshold, the second voltage conversion module 119 operates to convert the third direct-current voltage to output the fourth direct-current voltage.

In addition, the control unit 115 may record the voltage threshold and compare the voltage threshold with the second direct-current voltage for controlling the first voltage conversion module 114 to convert the second direct-current voltage or controlling the second voltage conversion module 119 to convert the third direct-current voltage, thereby outputting the fourth direct-current voltage. Similarly, when the voltage value of the second direct-current voltage is higher than the voltage threshold, the control unit 115 controls the first voltage conversion module 114 to convert the second direct-current voltage and output the fourth direct-current voltage. When the voltage value of the third direct-current voltage is lower than the voltage threshold, the control unit 115 controls the second voltage conversion module 119 to convert the third direct-current voltage and output the fourth direct-current voltage.

The first voltage conversion module 114 may be implemented as a step-down conversion circuit, such as a BUCK step-down circuit, a buck-boost circuit, or a charge pump circuit. The second voltage conversion module 119 may be implemented as a step-up conversion circuit, such as a BOOST step-up circuit, a BUCK-BOOST circuit, or a charge pump circuit.

It should be noted that the present disclosure does not limit the conversion ratio of the charge pump. In practical applications, the conversion ratio can be set according to actual requirements, for example, it can be set to 1:1, 2:1, or 3:1. In addition, when a higher voltage is required to be output, the conversion ratio of the charge pump may be set to 1:2 or 1:3 for the step-up operation.

Alternatively, the first voltage conversion module 114 and the second voltage conversion module 119 may further comprise a CUK circuit. The CUK circuit may achieve both step-up operation and step-down operation.

When the chargeable device 13 requires different charging voltages, the voltage threshold can also be determined based on the expected charging voltage fed back by the chargeable device 13. That is, when the expected charging voltage is high, the voltage threshold increases correspondingly. When the expected charging voltage is low, the voltage threshold lowered correspondingly. In one embodiment, the voltage threshold may be set to the expected charging voltage. For example, the desired charging voltage may be obtained by the control unit 115 through communication with the chargeable device 13.

According to the different voltage values of the pulsating direct-current voltage, different voltage conversion modules are selectively provided for the voltage conversion operation, which can avoid the problem that some voltage values cannot be converted using a single voltage conversion module (step-up or step-down), thereby improving the efficiency of the voltage conversion.

Moreover, the first voltage conversion module 114 and the second voltage conversion module 119 may operate alternately in a time division manner. Thus, the problems, such as heating on devices caused by a continuous operation of a single voltage conversion module, can be avoided.

Figure 5A:
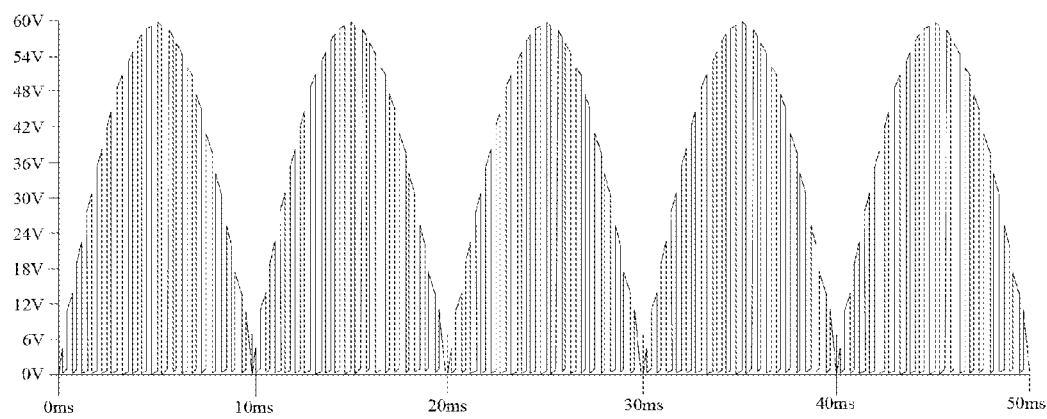
FIG. 5A illustrates a waveform of a pulsating direct-current voltage output by the secondary side of the transformer.
Figure 5B:
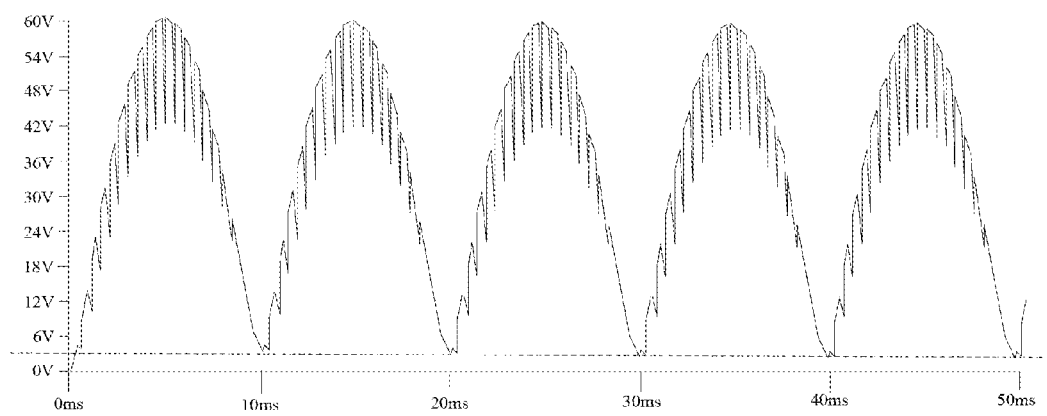
FIG. 5B illustrates a waveform of a pulsating direct-current voltage input to a voltage conversion module.

Taking the second direct-current voltage and the third direct-current voltage output by the secondary side of the transformer 112 that are pulsating direct-current voltages and have the same waveform and voltage value as an example, FIG. 5A illustrates a waveform of a pulsating direct-current voltage output by the secondary side of the transformer 112, and FIG. 5B illustrates a waveform of a pulsating direct-current voltage input to a voltage conversion module.

Taking the input at the input terminal of the first rectifier 111 as utility power as an example, after being rectified by the first rectifier 111, it is converted to a pulsating direct-current voltage with a voltage amplitude of 220V. The waveform of the pulsating direct-current voltage with the voltage amplitude of 220V after being stepped down by the transformer 112 is shown in FIG. 5A. At 0 ms, 10 ms, etc., the voltage value is equal to or even less than 0V. In an example, the first input capacitor 113 is arranged between the first voltage conversion module 114 and the first secondary winding 1122 of the transformer 112, and the second input capacitor 113 is arranged between the second voltage conversion module 119 and the second secondary winding 1123 of the transformer 112. Due to the existence of the first input capacitor 113 and the second input capacitor 118, when appropriate capacitance values are selected, the voltage value of the pulsating direct-current voltage input to the first voltage conversion module 114 or the second voltage conversion module 119 is not too low, so as to ensure the normal operation of the first voltage conversion module 114 or the second voltage conversion module 119. Taking the first voltage conversion module 114 implemented by a BUCK step-down circuit as an example, when the output peak value is 120 W load power, the first input capacitor 113 of 22 µF may be selected to effectively support the operation of the BUCK circuit. As shown in FIG. 5B, the minimum voltage value is about 3V, which is the minimum operation voltage of the BUCK circuit.

Selection of input capacitors for different voltage conversion modules in practical applications is a common knowledge in the art, and details are not repeated here. For example, when the second voltage conversion module 118 is a BOOST step-up circuit and the output peak value is 120 W load power, an input capacitor of 100 µF may be selected to effectively support the operation of the BOOST step-up circuit.

The control unit 115 is connected to the first voltage conversion module 114 for controlling the first voltage conversion module 114 to adjust the output voltage and/or the output current of the power supply device 11.

The power supply device of the embodiments of the present disclosure does not use bulky electrolytic capacitors and high-voltage withstanding filter capacitors on the primary side of the transformer for filtering the rectified pulsating direct-current voltage. On one hand, the volume of the power supply device can be reduced. On the other hand, since the liquid electrolytic capacitors are provided with a short service life and easy to burst, removing the liquid electrolytic capacitors can improve the service life and safety of the power supply device. Moreover, by moving the voltage conversion portion to the secondary side of the transformer, the voltage conversion modules are only required to process voltages with lower amplitudes so that a stable constant direct-current voltage can be output after the conversion. The control circuit for the voltage conversion is provided on the secondary side of the transformer, which may further decrease the number of used devices and reduce the volume of the power supply device.

The control unit 115 may also communicate with the chargeable device 13 through the charging interface 116, receive the first feedback information sent by the chargeable device 13, and, according to the first feedback information, control the first voltage conversion module 114 or the second voltage conversion module 119 to adjust the output voltage and/or the output current of the power supply device 11. The first feedback information may be, for example, the expected charging voltage and/or charging current of the chargeable device 13, or an adjustment command which is generated by the chargeable device 13 based on the expected charging voltage and/or charging current. The command, for example, a command for increasing or decreasing the output voltage and/or the output current.

As mentioned above, in the AC-DC power supply device shown in FIG. 1, since the voltage conversion process is on the primary side of the transformer, the adjustment process based on the feedback of the electrical apparatus is usually achieved through feeding the expected voltage by the electrical apparatus back to the control chip in the AC-DC power supply device, adjusting the pulse width or frequency of the PWM by the control chip according to the feedback of the electrical apparatus, obtaining the sampled voltage fed back from the transformer by the control chip, and further adjusting the pulse width or frequency of the PWM by the control chip according to the sampled voltage, thereby outputting a stable voltage. The feedback loop is long, and the real-time adjustment is poor. Moreover, the transformer feeds back an arc-shaped wave signal with a small voltage amplitude, but the final requirement is a direct-current signal output. Sampling the arc-shaped wave signal for adjusting and stabilize the direct-current signal output results in poor accuracy.

In the embodiments of the present disclosure, the control unit 115 controls the first voltage conversion module 114 or the second voltage conversion module 119 on the secondary side of the transformer directly according to the information fed back by the chargeable device 13, so as to adjust the output voltage and/or the output current of the power supply device 11. On one hand, there is no need to feed signals back to the primary side (i.e., the high voltage side) of the transformer through the secondary side of the transformer, which saves devices for the transmission of the feedback signals, such as an optocoupler, shortens the feedback transmission path, and improves the real-time feedback. On the other hand, the first voltage conversion module 114 or the second voltage conversion module 119 on the secondary side of the transformer is directly controlled based on the feedback information to adjust the output of the constant direct-current voltage, which results in high adjustment accuracy.

Referring to FIG. 3 and FIG. 4, the power supply device 11 further comprises a switch unit 117 that is connected to the primary winding 1121 of the transformer 112 for chopping and modulating the pulsating direct-current voltage input to the primary winding 1121 according to a high-frequency control signal. The switch unit 117 may be composed of, for example, a MOS transistor. The switch unit 117 is controlled by the high-frequency control signal so that the pulsating direct-current voltage can be chopped and modulated. A high-frequency signal may be provided to the transformer 112 so that the transformer 112 may be implemented by a high-frequency transformer. The frequency of the high-frequency control signal may be in a range of 50 KHz-2 MHz. Compared with low-frequency transformers (mainly used for the frequency of the utility power, such as 50 Hz or 60 Hz alternating-current power), high-frequency transformers are small in size. Thus, using a high-frequency transformer may reduce the size of the power supply device.

The high-frequency control signal of the switch unit 117 may be, for example, a signal of a fixed frequency. For example, the high-frequency control signal may be output to the switch unit 117 by a signal generator that provides a fixed frequency.

The control unit 115 may be configured to output the high-frequency control signal to the switch unit 117. In addition, the control unit 115 receives second feedback information of the chargeable device 13 and adjusts the frequency of the high-frequency control signal according to the second feedback information.

The second feedback information may be, for example, the information of the current charging stage of the chargeable device and/or the information of the power level of the battery 132 of the chargeable device. In addition, the second feedback information may further comprise, for example, the information of the temperature of the battery 122 of the chargeable device 13.

A control unit may be additionally provided to control the switch unit 117.

The following paragraphs describe the charging stages of the battery during the charging process.

The charging process of the battery may comprise the following charging stages: a trickle charging stage, a constant current charging stage, and a constant voltage charging stage.

In the trickle charging stage, the battery that has been discharged to a preset voltage threshold is pre-charged (i.e., recovery charging). The trickle charging current is usually one tenth of the constant current charging current. When the battery voltage rises to be above a trickle charging threshold, the charging current increases, and the charging process enters the constant current charging stage.

In the constant current charging stage, the battery is charged with a constant current, and the battery voltage rises rapidly. When the battery voltage reaches an expected voltage threshold (or cut-off voltage) of the battery, the charging process enters the constant voltage charging stage.

In the constant voltage charging stage, the battery is charged at a constant voltage, and the charging current gradually decreases. When the charging current decreases to a set current threshold (the current threshold is usually one tenth of the value of the charging current in the constant current charging stage or lower, or optionally the current threshold may be tens of milliamps or lower), the battery is fully charged.

In addition, after the battery is fully charged, due to the influence of the self-discharge of the battery, the partial current loss may occur. At this time, the charging process enters a supplementary charging stage. In the supplementary charging stage, the charging current is very small for ensuring that the battery is fully charged.

The constant current charging stage in the embodiment of the present disclosure does not require that the charging current remains completely constant. However, it may generally mean that the peak value or average value of the charging current remains unchanged for a period of time.

In practice, the constant current charging stage may be achieved by a multi-stage constant current charging manner for the charging operation.

The multi-stage constant current charging comprises M constant current stages (M is an integer not less than 2). The multi-stage constant current charging starts from the charging of the first stag with a predetermined charging current. The M constant current stages of the aforementioned multi-stage constant current charging are executed sequentially from the first stage to the M-th stage. After the previous constant current stage among the constant current stage turns into the next constant current stage, the current becomes smaller. When the battery voltage reaches the charging voltage threshold corresponding to the present constant current stage, it goes to the next constant current stage. The current conversion process between two adjacent constant current stages may be gradual, or it can be a step-like jumping change.

According to the above description, during the charging process of the battery, in the constant current charging stage, the charging current is the maximum, and the electric energy provided by the power supply device is the maximum so that the battery voltage increases rapidly. In the constant current charging stage, the switching frequency of the switch unit 117 may increase, that is, the frequency of the high-frequency control signal may increase, so as to speed up the extraction of energy.

In the trickle charging stage and/or the constant voltage charging stage, since the required charging current is small, the switching frequency of the switch unit 117 may decrease, that is, the frequency of the high-frequency control signal may decrease, so as to slow down the extraction of energy.

Similarly, when the volume of the battery 132 is low, the frequency of the high-frequency control signal may increase to speed up the extraction of energy. When the volume of the battery 132 is high, the frequency of the high-frequency control signal may decrease to slow down the extraction of energy.

The determination of the volume of the battery 132 may be implemented, for example, by presetting a threshold or a threshold range for the electric quantity.

Although the trickle charging stage, the constant current charging stage, and the constant voltage charging stage are used as examples in the above description, the "charging stages" described in the present disclosure are not limited to these, and they may be other charging stages.

In addition, the control unit 115 may further control the switch unit 117 according to the monitored input voltages of the first voltage conversion module 114 and the second voltage conversion module 119 so that the input voltages of the first voltage conversion module 114 and the second voltage conversion module 119 can meet the requirement of the voltage range for the operation, or the adjusted input voltages can cause the first voltage conversion module 114 and the second voltage conversion module 119 to be in an operating state with higher efficiency.

Referring to FIG. 4, the power supply device 11 may further comprise a second rectifier 120 and a third rectifier 122, both of which may be implemented as diodes as shown in FIG. 4. The second rectifier 120 is connected to the first secondary winding 1122 of the transformer 112 and configured to rectify the second direct-current voltage output by the transformer 112. The third rectifier 122 is connected to the second secondary winding 1123 of the transformer 112 and configured to rectify the third direct-current voltage output by the transformer 112.

In addition, the power supply device 11 may further comprise a first filter capacitor 121 and a second filter circuit 123 that have small-capacity or small-volume to filter the fourth direct-current voltage output by the first voltage conversion module 114 and the second voltage conversion module 119, such as filtering out the glitch of the output voltage, thereby improving the quality of the output voltage.

The following method embodiments of the present disclosure may be applied to the device embodiments of the present disclosure. For details not disclosed in the method embodiments of the present disclosure, please refer to the device embodiments of the present disclosure.

Figure 6:
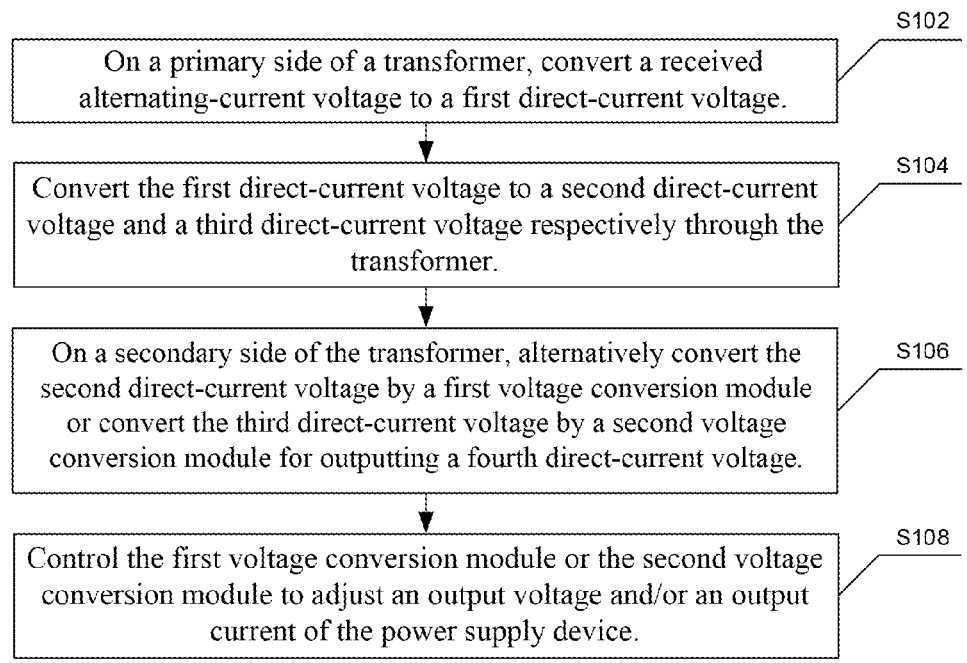
FIG. 6 is a flowchart of a charging control method according to an exemplary embodiment of the present disclosure.

FIG. 6 is a flowchart of a charging control method according to an exemplary embodiment of the present disclosure. The charging control method may be applied to the power supply device 11.

The charging control method 10 comprises blocks S102, S104, S106 and S108.

At block S102, on a primary side of a transformer, converting a received alternating-current voltage to a first direct-current voltage.

For example, the first direct-current voltage is a pulsating direct-current voltage.

At block S104, converting the first direct-current voltage to a second direct-current voltage and a third direct-current voltage respectively through the transformer.

The second direct-current voltage and the third direct-current voltage are pulsating direct-current voltages.

At block S106, on a secondary side of the transformer, alternatively converting the second direct-current voltage by a first voltage conversion module or converting the third direct-current voltage by a second voltage conversion module for outputting a fourth direct-current voltage.

At block S108, controlling the first voltage conversion module or the second voltage conversion module to adjust an output voltage and/or an output current of the power supply device.

The charging control method provided by the embodiment of the present disclosure does not use bulky electrolytic capacitors and high-voltage withstanding filter capacitors on the primary side of the transformer for filtering the rectified pulsating direct-current voltage. On one hand, the volume of the power supply device can be reduced. On the other hand, since the liquid electrolytic capacitor is provided with a short service life and easy to burst, removing the liquid electrolytic capacitors can improve the service life and safety of the power supply device. Moreover, by moving the voltage conversion portion to the secondary side of the transformer, only one small-capacity or small-volume input capacitor is required, and the voltage conversion modules are only required to process voltages with lower amplitudes so that a stable constant direct-current voltage can be output after the conversion. The voltage conversion modules are controlled on the secondary side of the transformer, which may further decrease the number of used devices and reduce the volume of the power supply device.

Figure 7:
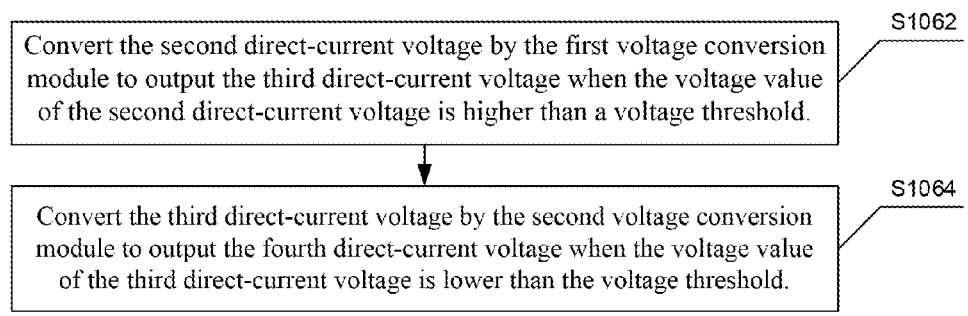
FIG. 7 is a flowchart of another charging control method according to an exemplary embodiment of the present disclosure.

FIG. 7 is a flowchart showing another charging control method according to an exemplary embodiment of the present disclosure. The charging control method may be applied to, for example, the power supply device 11. Different from FIG. 6, the charging control method shown in FIG. 7 further provides an embodiment where how to convert the second direct-current voltage by the first voltage conversion module or the third direct-current voltage by the second voltage conversion module on the secondary side of the transformer and to output the fourth direct-current voltage is described. That is, a block S106 is provided.

Referring to FIG. 7, block S106 comprises blocks S1062 and S1064.

At block S1062, converting the second direct-current voltage by the first voltage conversion module to output the third direct-current voltage when the voltage value of the second direct-current voltage is higher than a voltage threshold.

At block S1064, converting the third direct-current voltage by the second voltage conversion module to output the fourth direct-current voltage when the voltage value of the third direct-current voltage is lower than the voltage threshold.

In some embodiments, the control unit may control the operation of the first voltage conversion module or the second voltage conversion module. Step S106 may be implemented as: controlling the first voltage conversion module to convert the second direct-current voltage to output the third direct-current voltage when the voltage value of the second direct-current voltage is higher than the voltage threshold; controlling the second voltage conversion module to convert the third direct-current voltage to output the fourth direct-current voltage when the voltage value of the third direct-current voltage is lower than the voltage threshold.

The charging control method may further comprise: receiving an expected charging voltage fed back by a chargeable device connected to the power supply device. The voltage threshold is determined according to the expected charging voltage.

In the charging control method provided by the embodiments of the present disclosure, different voltage conversion modules are selected to perform the voltage conversion operation according to different voltage values of the pulsating direct-current voltage, which can avoid the problem that some voltage values cannot be converted using a single voltage conversion module (step-up or step-down), thereby improving the efficiency of the voltage conversion.

Figure 8:
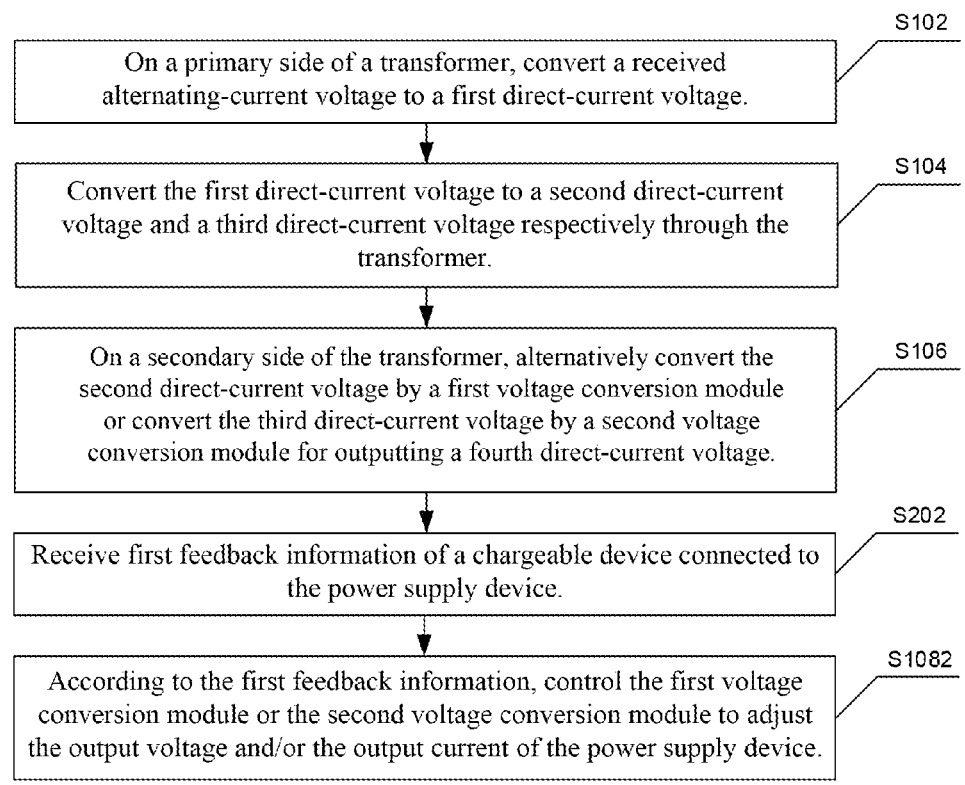
FIG. 8 is a flowchart of still another charging control method according to an exemplary embodiment of the present disclosure.

FIG. 8 is a flowchart showing another charging control method according to an exemplary embodiment of the present disclosure. The charging control method may be applied to, for example, the aforementioned power supply device. Different from FIG. 6, the charging control method 20 shown in FIG. 8 may further comprise block S202.

At block S202, receiving first feedback information of a chargeable device connected to the power supply device.

In addition, block S108 further comprises a block S1082: according to the first feedback information, controlling the first voltage conversion module or the second voltage conversion module to adjust the output voltage and/or the output current of the power supply device.

In some embodiments, the first feedback information may comprise: an expected charging voltage and/or an expected charging current of the chargeable device, or an adjustment command which is generated by the chargeable device based on the expected charging voltage and/or the expected charging current.

The charging control method provided by the embodiment of the present disclosure directly controls the first voltage conversion module or the second voltage conversion module arranged on the secondary side of the transformer according to the information fed back by the chargeable device, so as to adjust the output voltage and/or the output current of the power supply device. On one hand, there is no need to feed signals back to the primary side (i.e., the high voltage side) of the transformer through the secondary side of the transformer, which saves devices for the transmission of the feedback signals, such as an optocoupler, shortens the feedback transmission path, and improves the real-time feedback. On the other hand, the first voltage conversion module 114 or the second voltage conversion module 119 on the secondary side of the transformer is directly controlled based on the feedback information to adjust the output of the constant direct-current voltage, which results in high adjustment accuracy.

Figure 9:
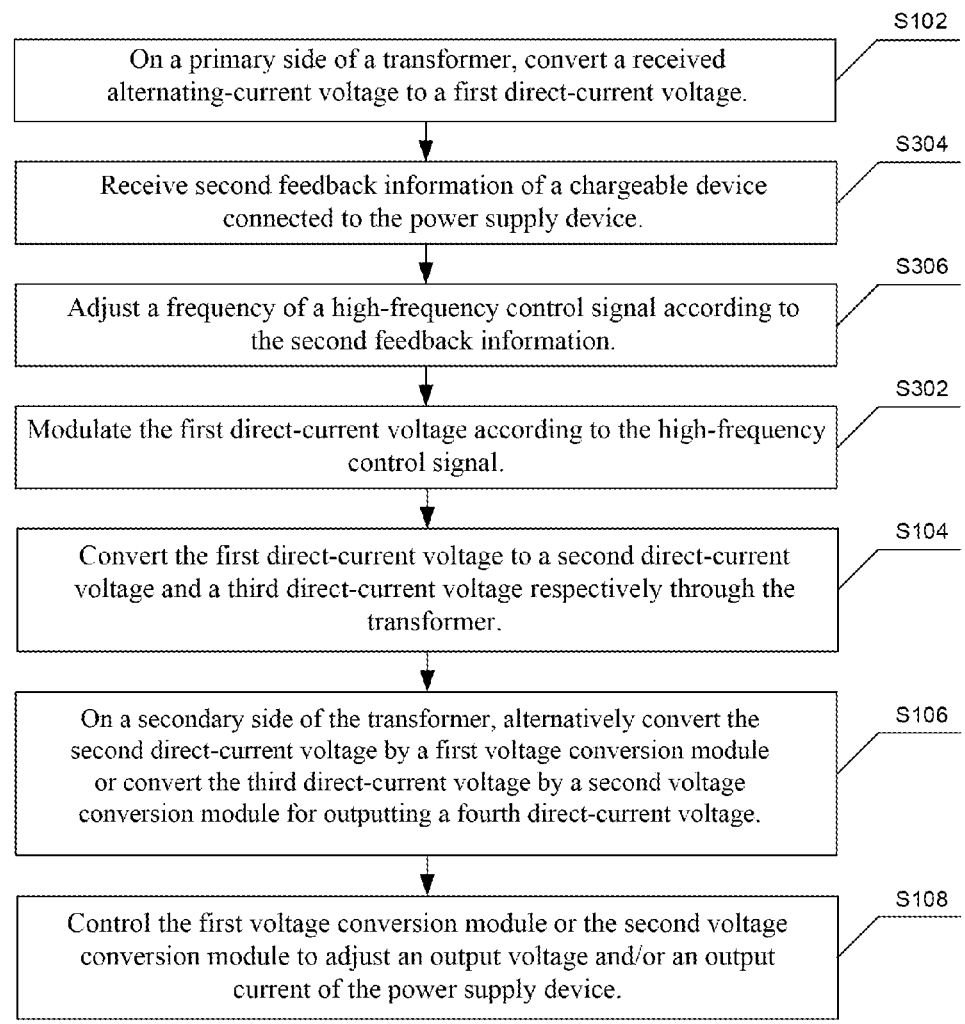
FIG. 9 is a flow chart of yet another charging control method according to an exemplary embodiment of the present disclosure.

FIG. 9 is a flow chart of yet another charging control method according to an exemplary embodiment of the present disclosure. The charging control method may be applied to, for example, the power supply device 11. Different from FIG. 6, the charging control method 30 shown in FIG. 9 may further comprise block S302.

At block S302, modulating the first direct-current voltage according to a high-frequency control signal.

The first direct-current voltage is chopped and modulated through the high-frequency control signal so that a high-frequency signal can be provided to the transformer and a high-frequency transformer can be selected. Compared with low-frequency transformers, high-frequency transformers are small in size. Thus, using a high-frequency transformer may reduce the size of the power supply device.

The charging control method 30 may further comprise block S304 and block S306.

At block S304, receiving second feedback information of the chargeable device connected to the power supply device.

At block S306, adjusting the frequency of the high-frequency control signal according to the second feedback information.

The second feedback information comprises: the information of the charging stage of the chargeable device, the information of the volume of the battery of the chargeable device.

It should be noted that the accompanying drawings are only schematic illustrations of the processes included in the methods according to the exemplary embodiments of the present disclosure, and are not intended to be limiting. It is easy to understand that the processes shown in the above figures do not indicate or limit the chronological order of these processes. In addition, it is also readily understood that these processes may be performed synchronously or asynchronously, for example, in multiple modules.

Exemplary embodiments of the present disclosure have been particularly shown and described above. It should be understood that the present disclosure is not limited to the details of construction, arrangements, or implementations described herein; on the contrary, this disclosure is intended to cover various modifications and equivalent arrangements included within the spirit and scope of the appended claims.

What is claimed is:

1. A power supply device, comprising:
   a transformer comprising a primary winding, a first secondary winding, and a second secondary winding;
   a first rectifier, connected to the primary winding of the transformer and configured to convert a received alternating-current voltage to a first direct-current voltage, wherein the transformer is configured to convert the first direct-current voltage to a second direct-current voltage provided by the first secondary winding and a third direct-current voltage provided by the second secondary winding;
   a first voltage conversion module connected to the first secondary winding of the transformer;
   a second voltage conversion module, connected to the second secondary winding of the transformer; wherein, alternatively, the second direct-current voltage is converted by the first voltage conversion module or the third direct-current voltage is converted by the second voltage conversion module, for outputting a fourth direct-current voltage; and
   a control unit, connected to the first voltage conversion module and second voltage conversion module, and configured to control the first voltage conversion module or second voltage conversion module to adjust an output voltage or an output current of the power supply device.

2. The power supply device of claim 1, further comprising:
   a first input capacitor; and
   a second capacitor,
   wherein the first voltage conversion module is connected to the first secondary winding of the transformer through the first input capacitor, and the second voltage conversion module is connected to the second secondary winding of the transformer through the second input capacitor.

3. The power supply device of claim 1, wherein the second direct-current voltage and the third direct-current voltage have the same waveform and the same voltage value.

4. The power supply device of claim 3, wherein the first voltage conversion module is configured to convert on the second direct-current voltage to output the fourth direct-current voltage in response to a voltage value of the second direct-current voltage being higher than a voltage threshold, and the second voltage conversion module is configured to convert the third direct-current voltage to output the fourth direct-current voltage in response to a voltage value of the second direct-current voltage being lower than the voltage threshold.

5. The power supply device of claim 3, wherein the control unit is further configured to control the first voltage conversion module to convert the second direct-current voltage to output the fourth direct-current voltage in response to a voltage value of the second direct-current voltage being higher than a voltage threshold, and further control the second voltage conversion module to convert the third direct-current voltage to output the fourth direct-current voltage in response to a voltage value of the second direct-current voltage being lower than the voltage threshold.

6. The power supply device of claim 4, wherein the control unit is further configured to receive an expected charging voltage fed back by a chargeable device connected to the power supply device, wherein the voltage threshold is determined according to the expected charging voltage.

7. The power supply device of claim 4, wherein the control unit is further configured to receive first feedback information of a chargeable device connected to the power supply device and, according to the first feedback information, control the first voltage conversion module or the second voltage conversion module to adjust the output voltage or the output current of the power supply device.

8. The power supply device of claim 7, wherein the first feedback information comprises an expected charging voltage or an expected charging current of the chargeable device, or comprises an adjustment command which is generated by the chargeable device based on the expected charging voltage or the expected charging current.

9. The power supply device of claim 1, further comprising: a switch unit connected to the primary winding of the transformer and configured to modulate the first direct-current voltage according to a high-frequency control signal.

10. The power supply device of claim 9, wherein the control unit is connected to the switch unit, and the control unit is further configured to output the high-frequency control signal to the switch unit, receive second feedback information of a chargeable device connected to the power supply device, and adjust a frequency of the high-frequency control signal according to the second feedback information.

11. The power supply device of claim 10, wherein the second feedback information comprises: information of a charging stage of the chargeable device, information of electric quantity of a battery of the chargeable device, or information of temperature of the battery.

12. The power supply device of claim 1, further comprising:
  a second rectifier, connected between the first secondary winding and the first voltage conversion module and configured to rectify the second direct-current voltage; and
  a third rectifier, connected between the second secondary winding and the second voltage conversion module and configured to rectify the third direct-current voltage.

13. A charging control method applied to a power supply device, comprising:
  converting a received alternating-current voltage to a first direct-current voltage by a primary side of a transformer;
  converting the first direct-current voltage to a second direct-current voltage and a third direct-current voltage through the transformer;
  on a secondary side of the transformer, alternatively converting the second direct-current voltage by a first voltage conversion module or converting the third direct-current voltage by a second voltage conversion module for outputting a fourth direct-current voltage; and
  controlling the first voltage conversion module or the second voltage conversion module to adjust an output voltage or an output current of the power supply device,
  wherein the method further comprises receiving first feedback information of a chargeable device connected to the power supply device; wherein the controlling the first voltage conversion module or the second voltage conversion module to adjust an output voltage or an output current of the power supply device comprises:
  controlling, according to the first feedback information, the first voltage conversion module or the second voltage conversion module to adjust the output voltage or the output current of the power supply device.

14. The charging control method of claim 13, wherein the second direct-current voltage and the third direct-current voltage have the same waveform and the same voltage value.

15. The charging control method of claim 14, wherein on a secondary side of the transformer, the alternatively converting the second direct-current voltage by a first voltage conversion module or converting the third direct-current voltage by a second voltage conversion module for outputting a fourth direct-current voltage comprises:
  converting the second direct-current voltage by the first voltage conversion module to output the fourth direct-current voltage in response to a voltage value of the second direct-current voltage being higher than a voltage threshold; and
  converting the third direct-current voltage by the second voltage conversion module to output the fourth direct-current voltage in response a voltage value of the third direct-current voltage being lower than the voltage threshold.

16. The charging control method of claim 14, wherein on a secondary side of the transformer, the alternatively converting the second direct-current voltage by a first voltage conversion module or converting the third direct-current voltage by a second voltage conversion module for outputting a fourth direct-current voltage comprises:
  controlling the first voltage conversion module to convert the second direct-current voltage to output the fourth direct-current voltage in response a voltage value of the second direct-current voltage being higher than a voltage threshold; and
  controlling the second voltage conversion module to convert the third direct-current voltage by the second voltage conversion module to output the fourth direct-current voltage in response a voltage value of the third direct-current voltage being lower than the voltage threshold.

17. The charging control method of claim 15, further comprising:
  receiving an expected charging voltage fed back by a chargeable device connected to the power supply device,
  wherein the voltage threshold is determined according to the expected charging voltage.

18. The charging control method of claim 13, wherein the first feedback information comprises: an expected charging voltage or an expected charging current of the chargeable device, or an adjustment command which is generated by the chargeable device based on the expected charging voltage or the expected charging current.

19. The charging control method of claim 14, further comprising:
  receiving second feedback information of a chargeable device connected to the power supply device, wherein the second feedback information comprises: information of a charging stage of the chargeable device, information of electric quantity of a battery of the chargeable device, or information of temperature of the battery;
  adjusting a frequency of a high-frequency control signal according to the second feedback information; and modulating the first direct-current voltage according to the high-frequency control signal.

\* \* \* \* \*